United States Patent [19]

Williams et al.

[11] 4,000,836

[45] Jan. 4, 1977

[54] PRESSURIZED DISPENSERS

[75] Inventors: Jillian A. Williams, Thorpe; Ronald James, Hillingdon, both of England

[73] Assignee: Wilkinson Sword Limited, Great Britain

[22] Filed: Aug. 12, 1975

[21] Appl. No.: 604,046

Related U.S. Application Data

[63] Continuation of Ser. No. 432,560, Jan. 11, 1974, abandoned.

[30] Foreign Application Priority Data

Aug. 8, 1973 United Kingdom ............ 39151/73

[52] U.S. Cl. ........................ 222/399; 260/28.5 A; 260/28.5 B; 260/29.1 SB; 260/31.8 G; 260/32.8 A; 260/33.2 R; 260/33.4 R; 260/33.4 PQ; 260/33.6 AQ; 260/33.6 PQ; 260/759; 260/760; 260/761

[51] Int. Cl.² ................... B65D 83/14; C08K 5/01; C08K 5/05; C08K 5/06

[58] Field of Search ............ 222/399; 260/29.1 SB, 260/31.8 G, 32.8 A, 33.2 R, 33.4 R, 33.4 PQ, 33.6 AQ, 33.6 PQ, 28.5 A, 28.5 B, 759, 760, 761

[56] References Cited

UNITED STATES PATENTS 3,858,764   1/1975   Watson ........................... 222/399

*Primary Examiner*—Donald E. Czaja
*Assistant Examiner*—H. H. Fletcher
*Attorney, Agent, or Firm*—Leydig, Voit, Osann, Mayer & Holt, Ltd.

[57] ABSTRACT

This invention relates to pressurized dispensers such as aerosol containers. The invention provides such dispensers containing a reservoir of an organic substance which dissolves at least 15% of its own weight of propellant at room temperature, the reservoir being capable of releasing the dissolved propellant on dispensing the contents of the container. The organic substance is an extended rubber. Various organic substances can be used to extend the rubber, and various rubbers can be extended. The extenders are generally less expensive than the unextended rubbers, and the extended rubbers can often dissolve as much, or in some cases more propellant than the same weight of unextended rubber. This provides a cost advantage over unextended rubbers. The reservoirs enable the head-space pressure in the dispenser to be maintained substantially constant throughout dispenser life, and foams, for example, of substantially constant density to be obtained.

10 Claims, No Drawings

PRESSURIZED DISPENSERS

This is a continuation of application Ser. No. 432,560, filed Jan. 11, 1974, and now abandoned.

This invention relates to pressurised dispensers such as aerosol containers.

According to the present invention there is provided a pressurised dispenser comprising a container provided with a valve-controlled outlet and containing a concentrate and a reservoir holding propellant, the reservoir comprising an extended rubber with which the propellant forms a solution and over which the vapour pressure of the dissolved propellant is less than that of the pure propellant, the extended rubber being capable of forming a solution with at least 15% of its own weight of propellant at room temperature, and the reservoir being capable of releasing propellant within the container as the contents of the container are dispensed.

The term "rubber" is used herein to refer to organic polymers having a low modulus of elasticity, a high extensibility and a very low crystallinity. Such materials are also referred to in the art as "elastomers".

The term "extended" as used herein means diluted with an organic filler which has the effect of increasing the volume of the rubber.

The use of an extender with a rubber can enable reservoirs for pressurised dispensers to be produced less expensively than reservoirs containing no extender, since the extenders are often less expensive than the rubber of the reservoirs. Furthermore, such extended rubbers can in some cases dissolve as much, or in some cases even more, propellant than an equal weight of the unextended rubber.

The rubber can be of natural or synthetic origin, and natural rubber can be chemically modified, for example partially vulcanised.

Extended natural rubber latex has been found to give a satisfactory performance as a reservoir in a pressurised dispenser. The latex can be a partially vulcanised latex. The reservoirs can also be produced by extending mixtures of natural rubber latex and partially vulcanised rubber latex.

Synthetic rubbers which can be used as the reservoirs can be homo-polymers, copolymers or block copolymers. Examples of homo-polymers which may be used include polyalkylenes and polyalkyldienes, e.g. polyisobutylene, butyl rubber, and polyisoprene. Copolymers which can be used in extended form as reservoirs include styrene/butadiene copolymers, ethylene/vinyl acetate copolymers, acrylonitrile/butadiene/styrene copolymers and copolymer rubbers produced from ethylene and propylene. Block copolymers which can be used include isoprene/styrene and styrene/butadiene block copolymers.

Plasticised synthetic polymers can also be used in extended form, e.g. polyvinyl chloride plasticised with diethyl phthalate, and extended.

Extended silicone rubbers can also be used as reservoirs.

The rubbers can be extended with one or more organic compounds such as an oil or wax.

Organic compounds which can be used as extenders should be of low volatility, generally having a vapour pressure of less than 10 mm. of mercury at 25° C, and include, for example, hydrocarbons, carboxylic acids, esters, ketones, ethers, alcohols, and silicone oils. The hydrocarbons can be solid or liquid and a preferred class of liquid hydrocarbons is the saturated aliphatic hydrocarbons containing at least 20 carbon atoms, preferably up to 25 carbon atoms. Saturated aliphatic hydrocarbons for use as extenders preferably have boiling points of from 290° to 410° C at normal atmospheric pressure, e.g. 2,6,10,14-tetramethylpentadecane. Lower molecular weight hydrocarbons can also be used e.g. 2,2,4-trimethylpentane or 2,2,5-trimethylhexane.

Other liquid hydrocarbons which can be used as extenders include, for example, isoprenoids, preferably containing at least 20 carbon atoms e.g. squalene.

Solid hydrocarbons, or hydrocarbon waxes, which can be used as extenders preferably have softening points of from 40° to 100° C. Examples of such hydrocarbons include soft white paraffin and microcrystalline wax. Soft white paraffin typically has a softening point of from 40° to 60° C and microcrystalline wax typically has a somewhat higher softening point. Paraffin waxes can also be used as extenders e.g. having a congealing point of about 49° or about 71° C.

Esters which can be used as extenders may be selected from aliphatic, alicyclic or aromatic esters. The aliphatic or alicyclic esters can be liquids or waxes, for example, alkyl esters of long chain fatty acids, fatty acid esters of long chain alcohols, or long chain fatty acid esters of sterols. Examples of esters which can be used as extenders include lower alkyl stearates or myristates e.g. butyl stearate or isopropyl myristate, carnauba wax (softening point 80°–90° C) and lanolin. Aromatic esters which can be used as extenders include, for example, di-lower alkyl esters of phthalic acid e.g. di-n-butyl phthalate.

Ketones which can be used as extenders include, for example, isoprenoid ketones e.g. camphor.

Ethers which can be used as extenders include substituted or unsubstituted diphenyl ether.

Mixtures of certain organic compounds have been found to be particularly effective extenders, for example liquid paraffin (a mixture of saturated $C_{20-25}$ aliphatic hydrocarbons containing up to 4 wt% of aromatics) and xylene or liquid paraffin and camphor.

Cholesterol and cetyl alcohol are examples of alcohols which can be used as an extender. Lauric acid is an example of a carboxylic acid which can be used as an extender.

Silicone oils can be used with advantage as extenders for silicone rubbers.

Other substances that can be used as extenders include chlorinated biphenyls and glycerol esters of $C_{20}$ terpene acids.

In general, straight chain extenders are preferable to branched chain extenders since straight chain extenders tend to function as better extenders.

Oils have been found to be suitable as extenders for natural rubber and chemically modified natural rubber such as partially vulcanised natural rubber latex. Hydrocarbon oils, and in particular liquid paraffin, have been found to be particularly valuable as extenders for polyalkylenes.

Rubbers can be extended with small amounts of extender, for example, less than 15% by weight. However, oils are preferably used in an amount of from about 20 to about 80% by weight of the total reservoir. The amount of oil present in the extended rubber should, however, be restricted to that which allows the reservoir to retain adequate mechanical strength. The reservoirs preferably contain about 50% by weight of rubber and about 50% by weight of oil. Some reservoirs having such a composition have been found to be capable of dissolving the same weight of propellant as an equal weight of rubber alone. The use of about 50% by weight of extender with about 50% by weight of rubber often provides particularly satisfactory reservoirs since reducing the amount of extender tends to reduce the cost savings resulting from the use of the extender whilst larger amounts tend both to reduce the weight of propellant dissolved by the extended rubber and to reduce the mechanical strength of the extended rubber.

With regard to waxes, the ratio of wax to rubber is generally less critical than the ratio of oil to rubber in relation to the mechanical strength of the extended rubber. However, waxes usually result in the extended rubber dissolving less propellant than if the rubber had been extended by an oil, and this tends to impose an upper limit on the amount of wax which can be used as an extender.

The main criteria in the choice of the materials of the reservoir are that the reservoir shall be compatible with the product to be dispensed and that it will form a solution with the propellant. These solutions should contain at least 15% by weight of propellant at room temperature. Preferred propellants include alkanes such as butane and fluorinated alkanes such as dichlorodifluoromethane and mixtures of dichlorodifluoromethane and symmetrical dichlorotetrafluoroethane (40:60 by weight, respectively).

As will be appreciated, the extender should be selected such that it is not leached from the extended rubber to any appreciable extent by the expellable contents of the container.

Reservoirs for pressurised dispensers as provided by the present invention can contain other substances such as structural fillers for strengthening the reservoir. The fillers should be materials which are inert to the propellant and to the rubber which forms the reservoir, and they are preferably less deformable than the rubber of the reservoir. Any of the fillers known in the rubber art to impart increased dimensional strength to rubbers may be used. Silica, zinc oxide and carbon black are illustrative examples of fillers which may be used. The inclusion of a filler should not adversely affect the ability of the rubber to form a solution with a given amount of propellant.

The following examples are given by way of illustration only:

EXAMPLE 1

Samples of various rubbers were extended with different amounts of a variety of extenders. The rubbers were extended by blending with the extender in the presence of toluene, and casting the blend to form sheets by evaporation of the toluene.

Samples of the resulting sheets were weighed and placed in a pressure bottle having a manometer for measuring the internal pressure in the bottle. The pressure bottle also contained a vessel holding a known volume of liquid propellant and the propellant was allowed to equilibrate between the extended rubber sheets, the head space in the pressure bottle and the liquid phase in the vessel. After equilibration, the volume of liquid propellant remaining in the vessel was measured, as was the head space pressure, and the amount of propellant dissolved by the polymer was calculated.

The following Tables 1 and 2 list results which were obtained with different propellants. Throughout the Tables, the percentage by weight of rubber in the sheets is given in parenthesis after the weight of propellant absorbed per 100g of extended rubber.

TABLE 1

Propellant: 40:60 by weight of dichlorodifluoromethane and symmetrical dichlorotetrafluoroethane.

| Rubber | Liquid Paraffin | Soft White Paraffin | Camphor + Liquid Paraffin (1:1 by volume) | Di-ethyl phthalate | No Extender (control) |
|---|---|---|---|---|---|
| Prevulcanised Natural Rubber latex (A330)[1] | 68 (67) | | | | 62 |
| Cariflex 1102[2] | 72 (50) | | | | |
| | 41 (70) | 38 (50) | 56 (50) | 36 (80) | 45 (in original form) |
| | 29 (60) | | | | 30 (cast from toluene) |
| | 44 (50) | | | | |
| | 37 (40) | | | | |
| | 38 (30) | | | | |
| Ethylene/ vinyl acetate copolymer (60:40) | 71 (80) | 41 (50) | | | 74 |
| | 61 (50) | | | | |
| Acrylonitrile/ butadiene/ styrene copolymer (Sternite A.B.S. A/100)[3] | 23 (50) | | | | 12 |

[1]A330 is manufactured by Dunlop Chemical Products Division, Birmingham, England.
[2]Cariflex 1102, the trade name for a polystyrene/butadiene/polystyrene block copolymer, is manufactured by Shell Chemicals Ltd., London, England, having the following properties: at 23° C, tensile strength (ASTM D412-64T) - 325 Kg. cm$^{-2}$ (dumbells cut from films cast from toluene, 20% by weight); modulus, 300% - 30 Kg. cm$^{-2}$; elongation of break - 1000%; viscosity of a 5% solution in toluene 3.5 cps (Brookfield).
[3]Sternite A.B.S. A/100 - (Sterling Moulding Materials Ltd., London, England) is an acrylonitrile/-butadiene/styrene copolymer described by its manufacturers as a compression moulding material.

TABLE 2

| Propellant: - | Butane 40. | | |
|---|---|---|---|
| Extender<br>Rubber | Liquid<br>Paraffin | Di-ethyl<br>phthalate | No<br>Extender<br>(control) |
| Cariflex 1102 | 57 (90)<br>48 (80)<br>60 (70)<br>48 (60)<br>63 (50)<br>38 (30) | 42 (80) | 42 |
| Ethylene/<br>vinyl acetate<br>copolymer<br>(60:40) | 36 (80) | | 47 |

EXAMPLE 2

6oz tin plate aerosol cans fitted with valves having 0.018 inch diameter orifices were filled with 160g of a mixture of 3% by weight of palmitic acid, 1% by weight of lauric acid, 3% by weight of triethanolamine, 5% by weight of sorbitol and 88% by weight of water. One batch of cans, which served as a control, was charged with a 40:60 by weight mixture of dichlorodifluoromethane and symmetrical dichlorotetrafluoroethane at the rate of 17g per can. A second batch of cans each contained 3g of natural rubber (A330) and they were each charged with 21g. of the propellant mixture. A third batch of cans each contained 3g. of extended natural rubber (A330 extended with liquid paraffin, 67:33 by weight) and they were each charged with 21g. of the propellant mixture.

After leaving the cans to equilibrate for 4 weeks, the valves on each can were operated and the foam density of the dispensed foam was determined as a function of the percentage of the contents remaining in the cans. The results obtained are shown in the accompanying drawing which shows the results in the form of a graph, curve A being the control, curve B the result of using an unextended rubber, and curve C the result of using an extended rubber.

We claim:
1. A pressurised dispenser comprising
   a container provided with a valve-controlled outlet and containing a concentrate, and
   a reservoir holding propellant, the reservoir comprising an extended rubber with which the propellant forms a solution and over which the vapour pressure of the dissolved propellant is less than that of the pure propellant, the rubber being extended by a substance having a low volatility and being compatible with but non-leachable by the propellant or the concentrate, the amount of extender present being at least 20% by weight but less than that which causes break up of the rubber,
   the extended rubber being capable of forming a solution with at least 15% of its own weight of propellant at room temperature, and
   the reservoir being capable of releasing propellant within the container as the contents of the container are dispensed.
2. A dispenser according to claim 1, wherein the rubber is selected from the group consisting of mixtures of natural rubber with partially vulcanised natural rubbers, polyalkylene rubbers, polyalkyladiene rubbers, copolymer rubbers, block copolymer rubbers, and silicone rubbers.
3. A dispenser according to claim 2, wherein the rubber is selected from the group consisting of styrene/butadiene copolymers, ethylene/propylene copolymer rubbers, isoprene/styrene block copolymers, and styrene/butadiene block copolymers.
4. A dispenser according to claim 1, wherein the extender is selected from the group consisting of hydrocarbons, carboxylic acids, esters, ketones, ethers, alcohols and silicone oils.
5. A dispenser according to claim 4, wherein the extender comprises a liquid, saturated aliphatic hydrocarbon containing at least 20 carbon atoms.
6. A dispenser according to claim 1, wherein the reservoir contains less than 15% by weight of an oil or wax as an extender.
7. A dispenser according to claim 1, wherein the extender is an oil and the reservoir contains from 20 to 80% by weight of oil.
8. A dispenser according to claim 7, wherein the reservoir contains about 50% by weight of oil.
9. A dispenser according to claim 1, wherein the reservoir includes a filler.
10. A dispenser according to claim 1, wherein the rubber in its unextended state is capable of forming a solution with at least 15% of its own weight of propellant at room temperature.

* * * * *